Dec. 9, 1958 J. W. LEBOLD 2,863,623
RETRACTABLE LANDING GEAR
Filed Sept. 9, 1953 3 Sheets-Sheet 1

INVENTOR.
JACK W. LEBOLD
BY George C. Sullivan
Agent

INVENTOR.
JACK W. LEBOLD

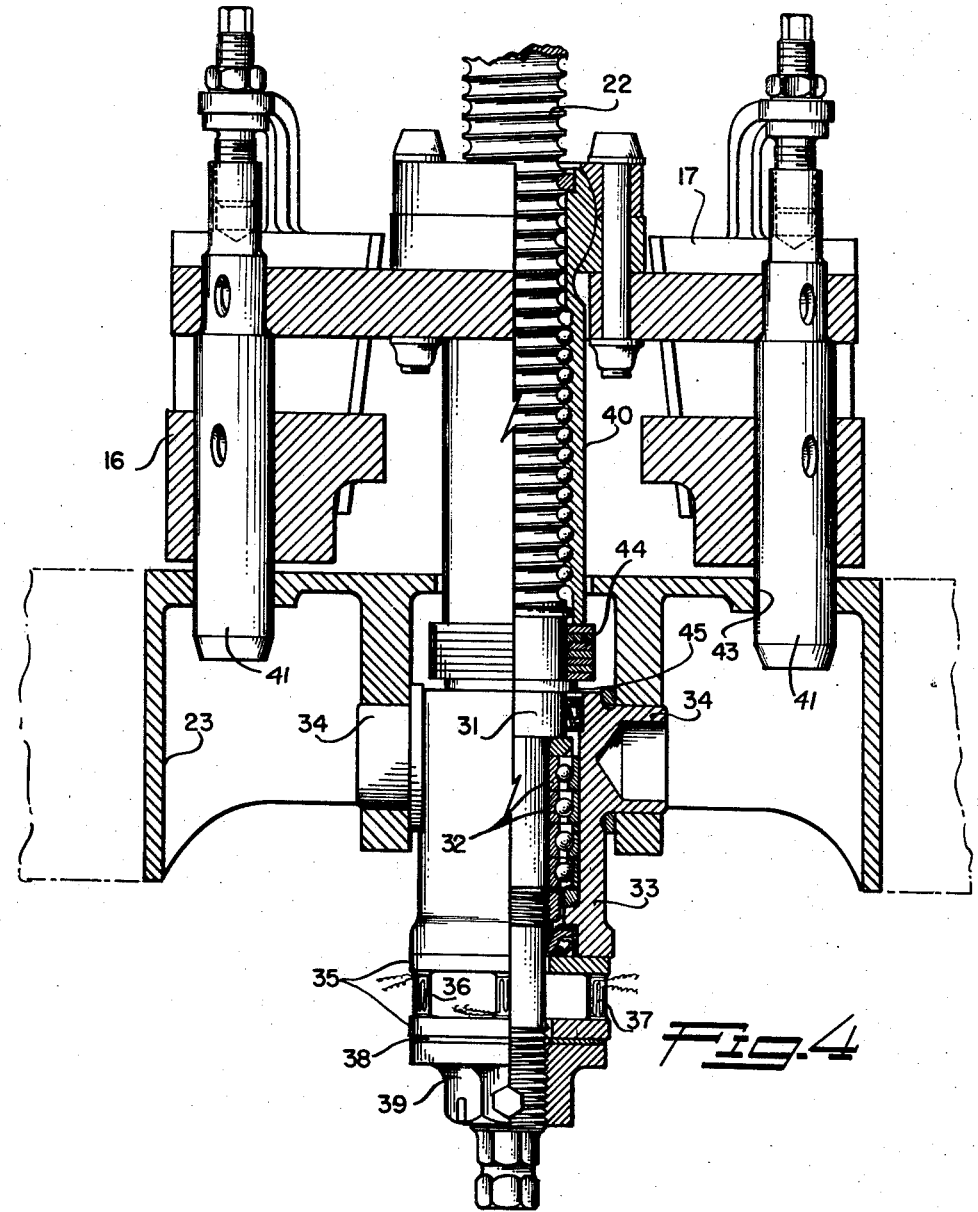

2,863,623
Patented Dec. 9, 1958

2,863,623

RETRACTABLE LANDING GEAR

Jack W. Lebold, Los Angeles, Calif., assignor to Lockheed Aircraft Corporation, Burbank, Calif.

Application September 9, 1953, Serial No. 379,112

5 Claims. (Cl. 244—102)

This invention relates to an improved landing gear extending and retracting mechanism providing for vertical retraction of the ground contacting wheels. This invention has particular reference to tandem main landing gears for cargo type aircraft having a rectangular fuselage section, as the landing gears can be mounted in tracks on the sides of the fuselage and extended to provide the desired ground clearance for the bottom of the fuselage.

It is an object of this invention to provide an improved and simplified tandem main landing gear for aicraft that retracts vertically in tracks mounted along the sides of a box section fuselage, with independent shock struts each carrying ground engaging wheels.

It is another object of this invention to provide a tandem main landing gear of the type described wherein tandem mounted shock struts are extended and retracted by separate screws having a common drive, wherein the screws are so mounted that vertical landing and impact loads on the shock struts are carried by the screws in tension, whereby to avoid compression loads in the screws.

It is a further object of this invention to provide load measuring means associated with each shock strut mounting whereby totaling the load measurements provides a check on the load and comparing the loads on the nose and tandem struts provides means to control loading to a desired center of gravity.

It is also an object of this invention to provide tandem landing gear of the type described wherein independent shock struts slide in tracks mounted on the fuselage and wherein means are provided to transfer drag, side and braking loads on the lower ends of the shock struts to fuselage structure separate from the sliding engagement between the struts and their tracks, using the tracks and an upper guide to steady the struts under load.

It is still another object of this invention to provide a tandem landing gear of the type described including power driven screw type extending and retracting means wherein the power drive includes a braking mechanism which serves as an uplock for the retracted landing gear.

It is a further object of this invention to provide a screw type landing gear extending and retracting mechanism where in a friction washer in the screw mechanism is subject to the load acting on the landing gear when in operation and thereby acts as a down lock when the gear carries the weight of the airplane.

Other objects and advantages of my invention will appear from the following description taken in connection with the accompanying drawings, wherein:

In the drawings:

Figure 4 is an elevation of the lower slider and bracket for the operating screw in the extended position of the gear, with parts broken away to show details of the structure.

Figure 1:
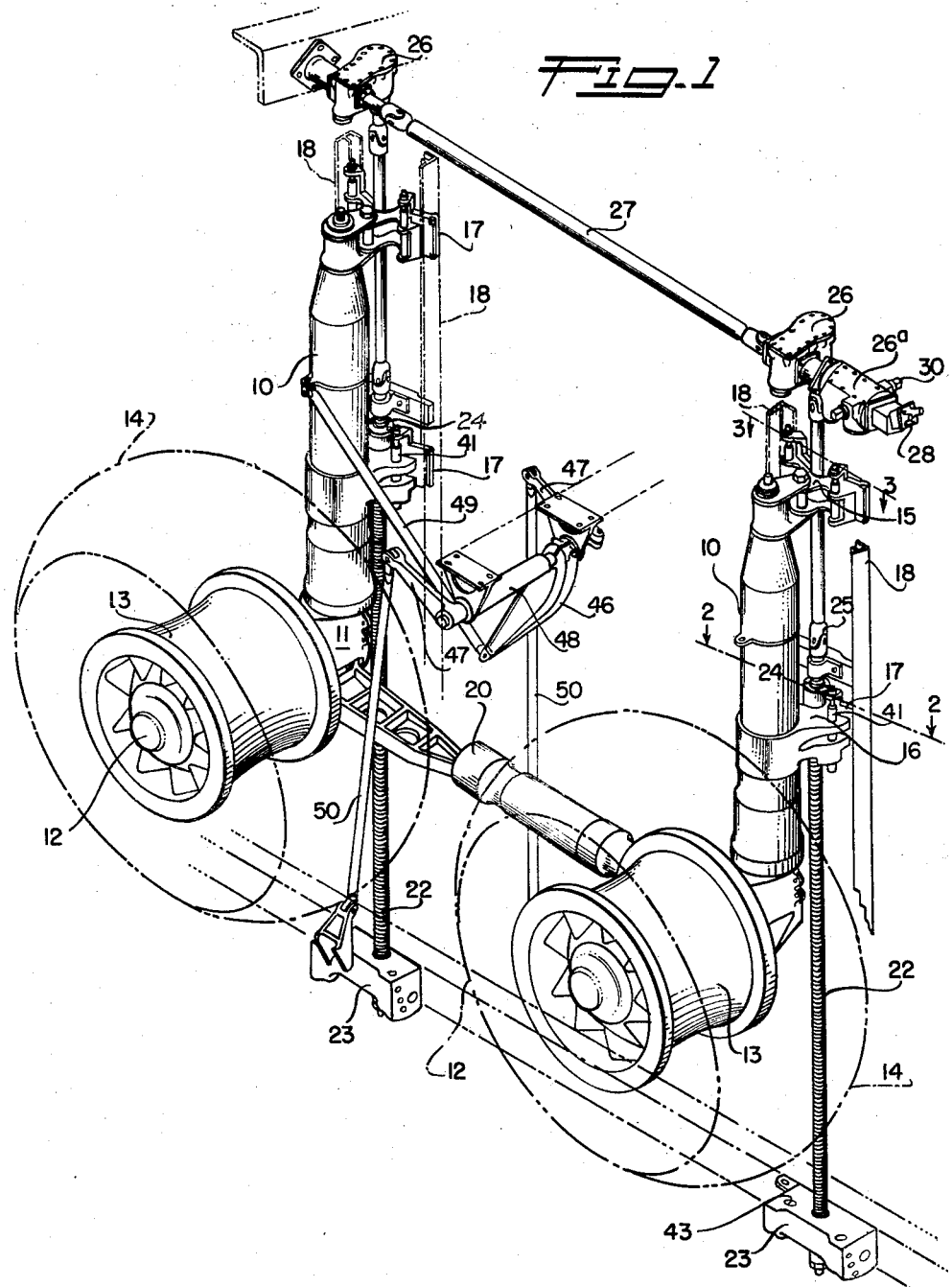
Figure 1 is a perspective view of a tandem landing gear arrangement incorporating the mountings and retracting mechanism of this invention.
Figure 2:
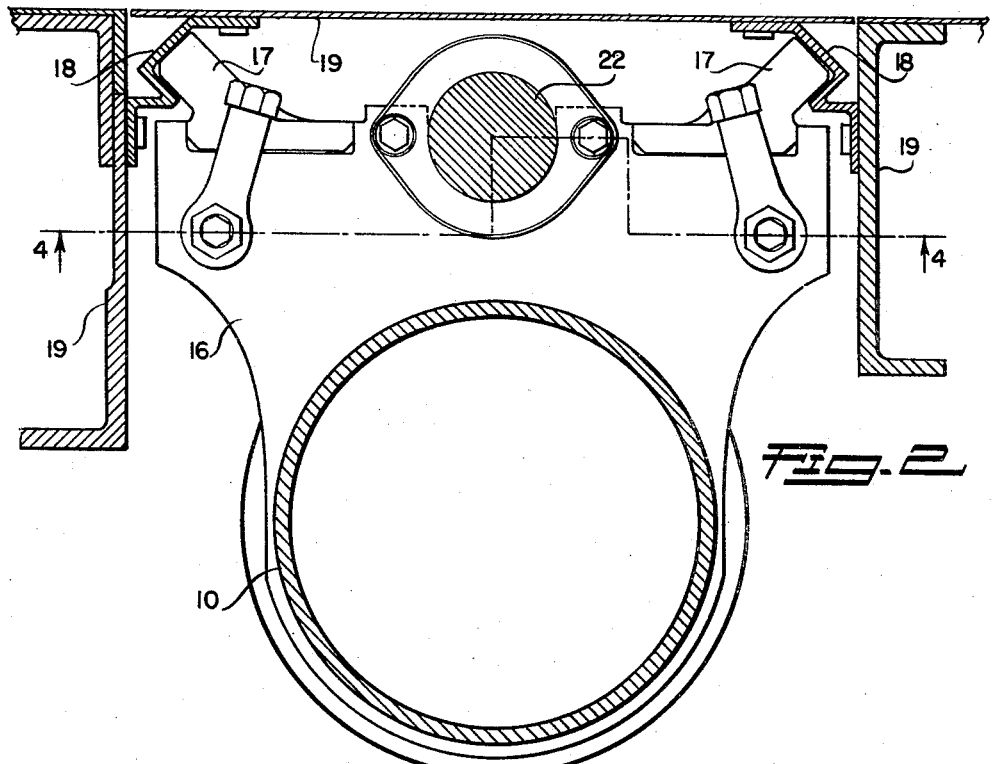
Figure 2 is a section taken on the line 2—2 of Figure 1 showing the arrangement of the lower slider supporting the shock strut.
Figure 3:
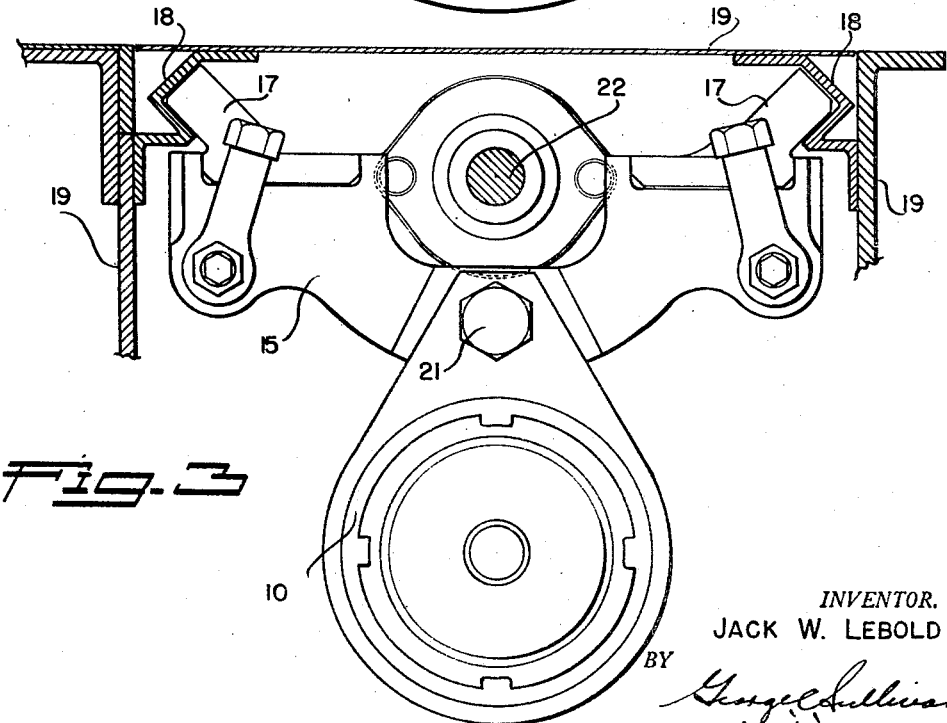
Figure 3 is a plan view of the top of the shock strut and upper slider, taken on the line 3—3 of Figure 1.

As shown:

A pair of conventional shock struts comprising outer cylinders 10 and inner cylinders 11 telescoping therein and carrying wheel spindles 12 with wheels 13 and tires 14 mounted thereon, is arranged in tandem parallel to the longitudinal axis of the airplane (not shown) to form one of the main landing gears of the airplane. The outer cylinders 10 of the struts carry upper and lower brackets 15 and 16 which carry adjustable shoes 17 sliding in opposed vertical tracks 18, the tracks being mounted on wall framing 19 of the aircraft fuselage, which fuselage is desirably of a box-like section best suited to cargo carrying airplanes.

A vertically articulated linkage 20 connects the movable inner cylinders 11 of the shock struts, as disclosed in the Hawkins Patent No. 2,487,548, to maintain the wheels 13 in tandem tracking alignment, thus eliminating the need of torque scissors, or the like, on each strut to prevent pivoting of the offset wheels under braking or drag forces, while permitting independent shock absorbing motions of the tandem wheels.

The upper brackets 15 are pivotally mounted at 21 to the tops of the outer cylinders 10 and the lower brackets 16 are rigidly mounted to the cylinders 10 near the lower ends thereof. The lower brackets 16 rigidly support the cylinders 10 in alignment with the tracks 18 while the pivotal mounting of the upper brackets 15 serves to compensate for any misalignment or weaving of the strut and/or tracks, the arrangement forming a vertical three point mounting comprising the pivotal mount 21 and the two shoes 17 in the lower bracket 16.

The shock strut cylinders 10 are extended and retracted along the tracks 18 by screws 22 journaled at their free or lower ends in mounting brackets 23 attached to the fuselage and intended to carry the entire load imposed on the landing gear, as will later be described. The upper ends 24 of the screws have universal jointed shafts 25 connecting to gear boxes 26 for driving the screws, these boxes 26 being connected by a universal jointed driving shaft 27 driven through a brake unit 26a by a hydraulic or other type of motor 28, the brake unit serving as an uplock and downlock when the landing gears are retracted or extended. The brake unit has an actuating external stub shaft 30 to which a hand crank can be applied for manually lowering the landing gear in emergencies.

The lower end 31 of each screw 22 is mounted in thrust bearings 32 in a sleeve 33 having trunnion mountings 34 in the respective lower bracket 23 attached to the fuselage. A non-rotating load measuring capsule comprising spaced collars 35 connected by posts 36 which carry electrical strain gauges 37 is associated with each support 33. The collars 35 are interposed between the supports, friction washers 38 and nuts 39 threaded on the ends of the screws 22 to take the upward loads imposed on the screws 22, the friction washers acting as additional down locks for the shock struts when the load thereon increases due to ground contact.

Each screw 22 engages in a recirculating ball type of nut 40 which is universally mounted at its upper end in the lower bracket 16 carried by the shock cylinder 10, the arrangement being such that all upward loads on the strut are carried by the recirculating ball nut 40 and are converted into tension loads in the lower end 31 of the screw 22 between the ball nut 40 and the nut 39 on the end of the screw 22. Thus, the unsupported length of the screws 22 between the ball nuts 40 and the gear boxes 26 are not subject to compression loading due to ground forces acting on the landing gear, as these portions of the screws are merely subjected to the dead weight and retracting and extending loads of the landing gear.

The strain gauges 37 applied to the load measuring capsules can be connected to a conventional load indicating circuit to indicate variations in gauge loading on the tandem gears and a similar strain gauge on the nose gear of a tricycle gear installation, or to total the loads of the two sets of tandem gears on either side of the fuselage, thus measuring the total load on the landing gears as well as indicating the load distribution relative to the desired center of gravity of the airplane. The shift in loads between the nose and main struts of a tricycle landing gear when the airplane is in its static ground position forms an accurate indication of the load distribution because the main gears carry most of the airplane weight, the nose gear used therewith carrying only a small part of the weight and its strut expanding or collapsing with a shift in the center of gravity of the airplane, rocking the airplane about the tricycle landing gears to produce a differential load reading between the nose and main wheels thereof.

When the landing gears have reached their extended position, the lower brackets 16 on the struts closely approach the lower brackets 23 fastened to the fuselage, in which the lower ends of the screws 22 are journaled, as shown in Figure 4. In this position dowel pins 41, carried by the brackets 16, enter into suitable holes 43 in the brackets 23 to relieve the screws and tracks 18 of any torsion or twisting loads resulting from the offset wheel axes relative to the struts 10. Further, a series of dished washers 44 is mounted on the lower end of each screw 22 and bears against a collar 45 thereon to be contacted and compressed by the final part of the downward movement of the ball nut 40 on the screw, thus forming a yielding abutment for the nut at the end of its travel, to prevent power jamming of the screw and nut.

Operating mechanism for landing gear doors or fairings (not shown) are indicated in Figure 1 wherein the bell cranks 46, 47 on a shaft 48 are operated by a link 49 attached to one strut cylinder 10 and actuating links 50 are attached to the doors in such a manner that when the gear is extended the doors are swung open.

The operation of the disclosed landing gear arrangement should be apparent from the foregoing description, having reference to the accompanying drawings, but will be summarized herewith. With the gear retracted as in Figure 1, the hydraulic motor 28 is energized, and the rotation thereof automatically releases the brake unit, by the pilot operating a suitable valve to its gear extended position, causing the motor to operate to drive both screws 22 through the gear bores 26 in a direction to cause the recirculating ball nuts 40 to move downwardly on the screws, pushing the struts 10 downwardly in the tracks 18. When the nuts 40 come to rest against the spring washers 44 the dowels 41 in the strut brackets 16 engage the brackets 23 to transfer twisting loads on the strut 10 directly to the brackets 23 mounted on the fuselage. With a nut 40 bottomed on the washers 44, as shown in Figure 4, the ground contact loads are transmitted from the nut through the screw 22 to the sleeve 33 and the bracket 23, imposing tension forces on the screw 22 between the nut 39 on the end of the screw and the ball nut 40. These ground forces act on the friction washer 38 to lock the screw and thereby serve as a downlock preventing inadvertent retraction of the landing gear when the airplane weight is carried thereby. As soon as the airplane becomes airborne the load on the friction washer 38 is relieved so that the pilot can then retract the gears by reversing the motor 28.

Having thus described my invention and the present preferred embodiments thereof, I desire to emphasize the fact that many modifications may be resorted to in a manner limited only by a just interpretation of the following claims.

I claim:

1. A landing gear for aircraft fuselages comprising tandem shock absorbing struts including ground engaging means, mounts therefor including spaced vertical tracks attached to the sides of the aircraft fuselage, lower guide brackets rigidly attached to the struts and slidable in said tracks, upper guide brackets having pivotal connections with the struts and also slidable in said tracks, means operatively engaged with the lower guide brackets for extending and retracting said struts along said tracks, and a reversible driving motor operatively connected with said last mentioned means for operating the same.

2. A landing gear as defined in claim 1 characterized by brackets fixed to the fuselage, and means on said lower guide brackets engageable with said brackets fixed to the airplane structure when the landing gear is extended to transfer torsion loads from the struts to the airplane fuselage when the landing gear is under load.

3. A landing gear as defined in claim 1 wherein the means for extending and retracting the struts comprise brackets secured to the aircraft fuselage, screws, thrust bearings journaling the screws in the brackets fixed to the aircraft fuselage and nuts engaging said screws and carried by said lower guide brackets fixed to the struts.

4. A landing gear as defined in claim 1 wherein the means for extending and retracting each strut comprises a screw journaled on the fuselage to be between and parallel to the tracks guiding said strut and a recirculating ball nut engaging the screw, said ball nut being universally mounted in the lower guide bracket of the strut.

5. A tandem type landing gear for an airplane fuselage arranged for vertical extension and retraction at a side of the fuselage comprising at least two shock absorbing struts spaced fore and aft from one another at the side of the fuselage and each carrying ground engaging means, separate vertical tracks for each shock strut, said tracks being mounted on the side of the airplane fuselage, a pair of guide brackets attached to each shock strut and slideably engaging its respective tracks; screw means associated with each strut for extending and retracting the same along said tracks comprising screws mounted between and parallel to the tracks guiding said struts and a recirculating ball nut engaging the screw means for each strut, and said ball nut being universally mounted in one of the guide brackets carried by each strut.

References Cited in the file of this patent

UNITED STATES PATENTS

| | | |
|---|---|---|
| 2,078,823 | Weaver | Apr. 27, 1937 |
| 2,092,662 | Weymouth | Sept. 7, 1937 |
| 2,159,058 | Taylor et al. | May 23, 1939 |
| 2,383,901 | Werner | Aug. 28, 1945 |
| 2,481,635 | Wheeler | Sept. 13, 1949 |
| 2,487,548 | Hawkins | Nov. 8, 1949 |
| 2,523,962 | Mahaffey et al. | Sept. 26, 1950 |

FOREIGN PATENTS

| | | |
|---|---|---|
| 158,209 | Great Britain | May 26, 1921 |